United States Patent [19]

Price, Sr.

[11] Patent Number: 5,299,832
[45] Date of Patent: Apr. 5, 1994

[54] REAR FENDER SUPPORT FOR MOTORCYCLE

[75] Inventor: Ted L. Price, Sr., Columbia, S.C.

[73] Assignees: Ted L. Price; Mike Garvey

[21] Appl. No.: 764,895

[22] Filed: Sep. 24, 1991

[51] Int. Cl.$^5$ ............................................. B62D 25/18
[52] U.S. Cl. ................................. 280/854; 280/152.1; 280/769; 280/304.3; D12/114
[58] Field of Search ................. 280/152.1, 152.2, 154, 280/769, 852, 854, 291, 293, 304.3, 304.4, 152.3; 296/63; 248/230; D12/114, 117, 118, 119

[56] References Cited

U.S. PATENT DOCUMENTS

| | | | |
|---|---|---|---|
| 511,405 | 12/1893 | Cable | 280/152.1 |
| 590,980 | 10/1897 | Hall | 280/152.3 |
| 606,359 | 6/1898 | Reid | 280/152.3 |
| 617,504 | 1/1899 | Hermann | 280/152.3 |
| 704,885 | 7/1902 | Lambert et al. | 280/152.2 |
| 853,115 | 5/1907 | Reuss | 280/304.3 |
| 1,398,448 | 11/1921 | Smith | 280/152.2 |
| 1,532,508 | 4/1925 | MacDonald | 280/854 X |
| 1,565,016 | 12/1925 | Lake, Jr. | 280/202 |
| 1,803,508 | 5/1931 | Rossman | 248/230 X |
| 2,299,218 | 10/1942 | Fener | 248/230 X |
| 2,491,009 | 12/1949 | Lawrence | 248/230 X |
| 2,771,305 | 11/1956 | Buegeleisen | 280/152.2 X |
| 4,095,820 | 6/1978 | Hanagan | 296/63 X |
| 4,186,937 | 2/1980 | Schultz | 280/304.4 |
| 4,458,909 | 7/1984 | Morioka | 280/279 |
| 4,500,101 | 2/1985 | Aoki | 280/152.1 |
| 4,993,731 | 2/1991 | Fuller | 280/304.4 X |

FOREIGN PATENT DOCUMENTS

| | | | |
|---|---|---|---|
| 660002 | 5/1938 | Fed. Rep. of Germany | 280/152.3 |
| 934390 | 9/1955 | Fed. Rep. of Germany | 280/152.2 |
| 86989 | 2/1956 | Norway | 280/152.2 |
| 540388 | 10/1941 | United Kingdom | 280/152.2 |
| 723152 | 2/1955 | United Kingdom | 280/152.2 |

OTHER PUBLICATIONS

Cycle World, "A Quick Hit of Ness Cafe" and from Sportster to Speedster pp. 30-31 and 42-47 resp., Jun. 1991.

Primary Examiner—Brian L. Johnson
Attorney, Agent, or Firm—Michael A. Mann

[57] ABSTRACT

A pair of clamps for supporting the rear fender of a motorcycle. Each clamp has two portions, one portion having a curved member extending therefrom, and both portions having recesses formed in each portion that, when the portions are brought together and aligned, form a channel dimensioned to grip the motorcycle frame securely just behind and below the seat. The curved members follow the rear fender upwardly and rearwardly from the frame and are bolted thereto with spacers between the fender and each curved member. Additional support and stability is obtained by one or more members that run from one curved member to the other under the seat transversely to the curved members.

19 Claims, 5 Drawing Sheets

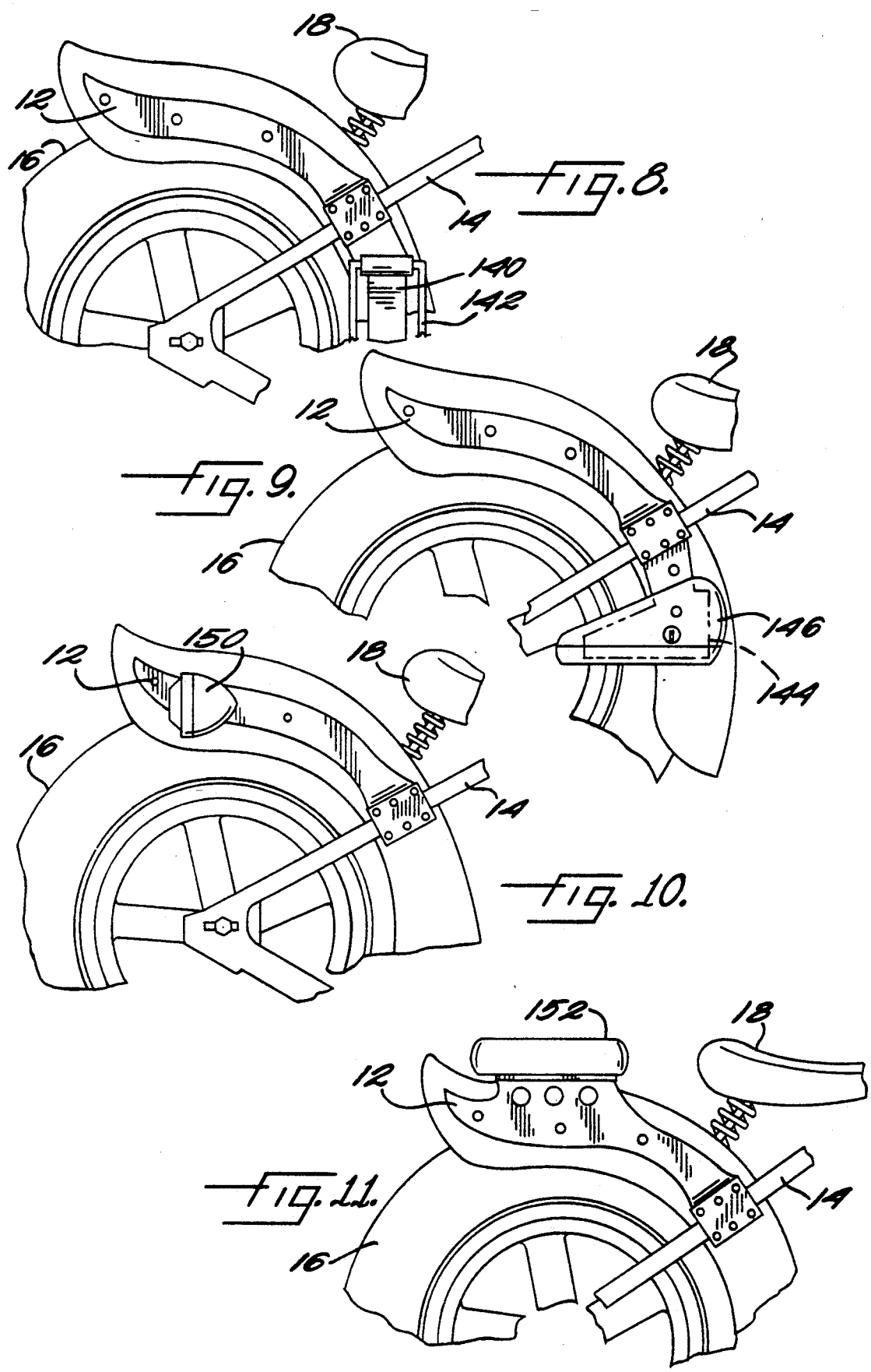

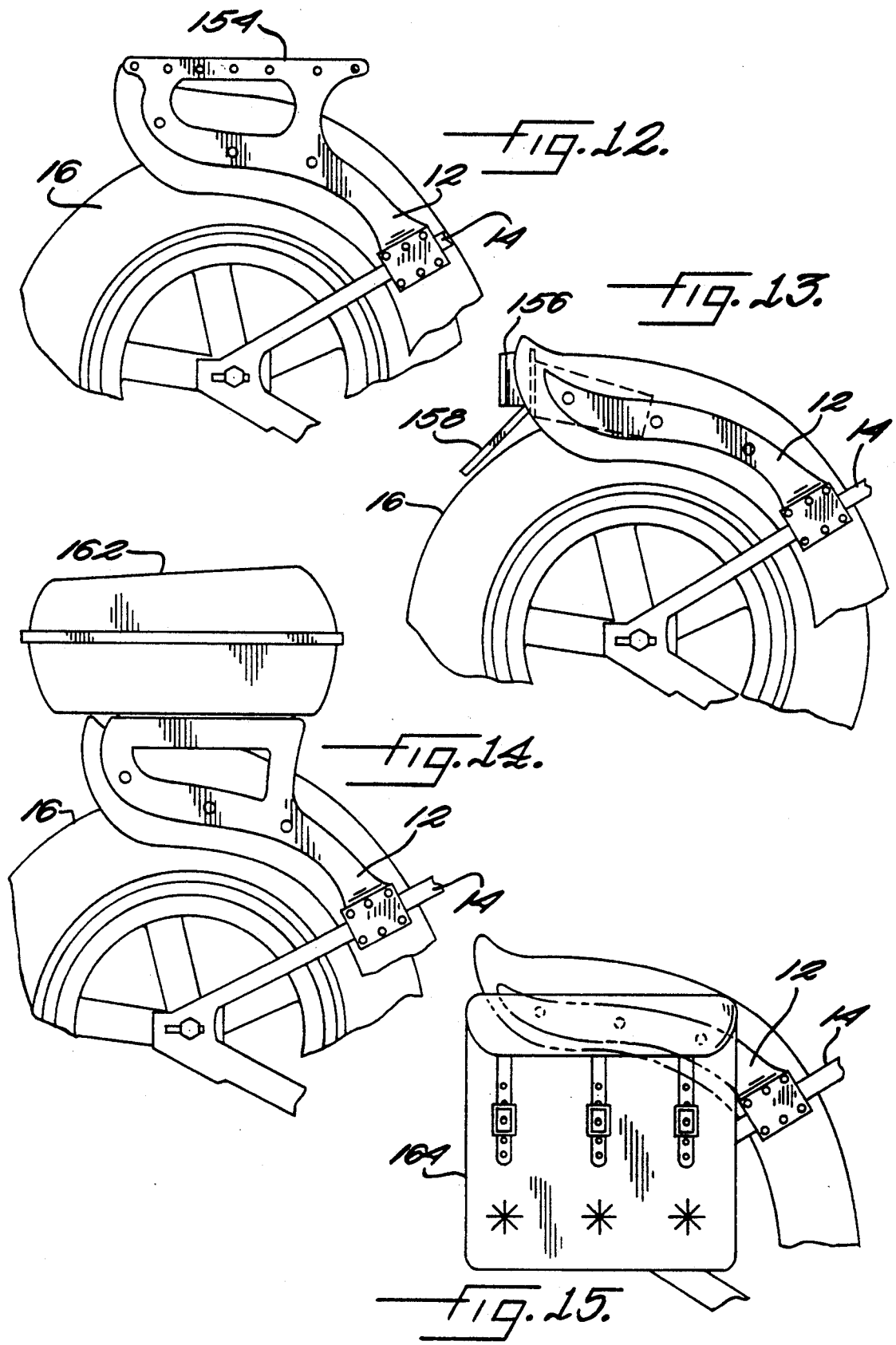

REAR FENDER SUPPORT FOR MOTORCYCLE

BACKGROUND OF THE INVENTION

1. Field of the Invention

The present invention relates to supports for the rear fenders of motorcycles.

2. Discussion of Background:

There are a number of existing supports for a rear fender of a motorcycle. The most common are in the form of struts attached to the rear axle, including the well-known "sissy" bar. Some, however, are attached to a portion of a motorcycle other than the axle. These are routinely fastened by welding or by drilling holes directly into the frame for bolting the support to the frame.

Morioka, however, in U.S. Pat. No. 4,458,909, discloses a front fender support fastened to the front forks using clamps with flanges for bolt holes and bolts.

Although welding and bolting to the frame will provide strong support, the strength of such fastening means is not the only consideration. The integrity of the frame and the overall appearance of the motorcycle with the support are also important considerations. In order to understand why, one must appreciate that motorcycles are not simply a form of transportation or a vehicle for recreational use. Some motorcycles have intrinsic value over and above their vehicular uses to aficionados and collectors. For example, Harley-Davidson motorcycles have a long and interesting history, and are known as a brand of motorcycle distinctive in sound and appearance. A great deal has been written about the image, history, artistic value and cult following surrounding Harley-Davidson motorcycles, which are coveted in the United States and abroad.

Vintage Harley-Davidson motorcycles in mint condition are exceptionally valuable. The frame alone of such a vintage motorcycle commands a premium price if its integrity has not been compromised by bolting or welding. Prior to about 1965, the frames of Harley-Davidson motorcycles were rigid, with two members of the frame extending downward and rearward from the seat on both sides of the rear wheel to the rear axle. The fender projected above the rear wheel rearward from just below the seat.

If additional seating on the rear fender or support on the rear fender for baggage is desired, a strut or "sissy" bar is welded or bolted between the axle and the fender. However, struts interfere with the clean lines of the original machines, where nothing appeared between the axle and the fender.

On newer motorcycles, supports are provided from the frame following the curve of the fender. These are permanently attached to the frame at the factory. However, applicant is not aware of the appreciation of the problem presented to owners of older, vintage Harley-Davidson motorcycles or, indeed of any rigid-frame motorcycle, where the owner does not want to compromise the integrity of the original frame and does not want to interfere with the lines of the motorcycle, but wants to provide additional support for the rear fender.

SUMMARY OF THE INVENTION

According to its major aspects and broadly stated, the present invention is an article for supporting the rear fender of a motorcycle, and in particular a motorcycle with a rigid frame such as those manufactured by Harley-Davidson. The device grips the frame just behind and below the seat and extends upwardly and rearwardly from the frame, following the contour of the rear fender, to support the fender with sufficient strength to hold a rear seat and rider.

In particular, the article comprises a pair of clamps, each clamp having two portions, one of the portions having a curved member attached to it and extending therefrom in curved fashion. The two portions have complementary recesses, which, when brought together, form a channel dimensioned to receive the frame of the motorcycle. The two portions are flanged and have holes formed in the flanges for use in bolting the two portions together and gripping the frame therebetween. The curved members are bolted to opposing sides of the fender and may optionally be interconnected by means of transverse members running under the fender from one curved member to the other.

A feature of the present invention is the clamp, with its flanges and bolts that enable the clamp to grip the frame without affecting the integrity of the frame. The frames of certain vintage motorcycles, if intact and unaltered, have considerable value. By gripping the frame securely but without using bolts or equivalent fastening means running through the frame, the value and structural integrity of the frame are preserved and the rear fender can be used in a number of different ways. The present clamps will support a rear seat and rider, for example, without the need for a strut or "sissy" bar attached to the rear axle.

Another feature of the present invention is the positioning of the clamps. By locating the clamps just behind and below the seat and using the curved portions for cantilevered support of the fender, the lines of the motorcycle are preserved. Specifically, there is no strut rising from the rear axle to clutter the clean appearance of the rear wheel supported only by the rigid frame and the fender riding above the wheel. To many aficionados of motorcycles, especially those who value Harley-Davidson motorcycles, it is important to preserve the clean lines of the original design.

In its preferred embodiment, the curved members are bolted to the fender, with spacers between the fender and the curved members. In addition to aesthetic value, the spacers allow the rear fender and curved members to provide support for additional items carried by the motorcycle. Also as part of a preferred embodiment, the curved members can be interconnected with members running under the frame from one curved member to the other, transverse to the axis of the fender and curving in a "U"-shape to avoid interference with the tire. These additional members can add stability and strength to the fender, especially when additional gear is to be supported.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 8 is a partial, side view of a motorcycle showing the present invention providing support for an oil filter;

FIG. 9 is a partial, side view of a motorcycle showing the present invention providing support for a tool kit;

FIG. 10 is a partial, side view of a motorcycle showing the present invention providing support for rear lighting;

FIG. 11 is a partial, side view of a motorcycle showing the present invention providing support for a rear seat pad;

FIG. 12 is a partial, side view of a motorcycle showing the present invention providing support for a luggage rack;

FIG. 13 is a partial, side view of a motorcycle showing the present invention providing support for a tail light and license bracket;

FIG. 14 is a partial, side view of a motorcycle showing the present invention providing support for a tour pack; and FIG. 15 is a partial, side view of a motorcycle showing the present invention providing support for saddle bags.

DETAILED DESCRIPTION OF A PREFERRED EMBODIMENT

Figure 1:
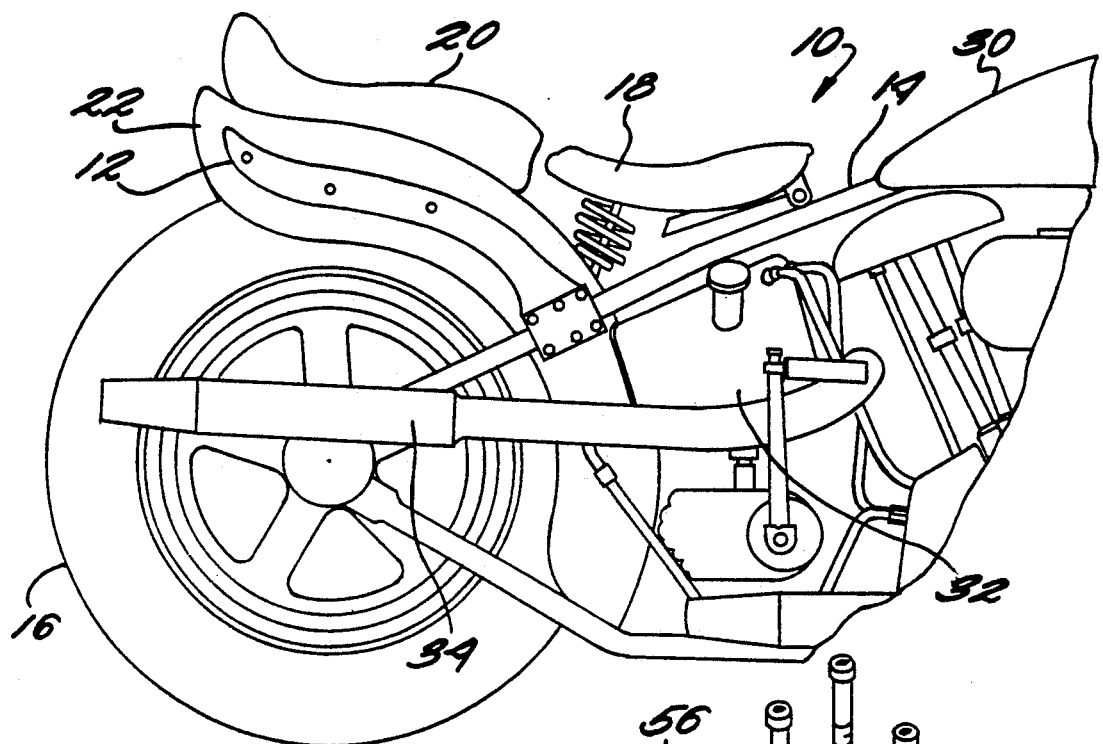
FIG. 1 is a side view of an article according to a preferred embodiment of the present invention mounted onto the frame of a motorcycle, partially shown.

Referring now to FIG. 1, there is illustrated in part a motorcycle 10 having an article 12 according to a preferred embodiment according the present invention. Motorcycle 10 comprises in the main a frame 14 and a rear wheel 16 attached thereto. On frame 14 is a main seat 18 and a rear seat 20 mounted to a rear fender 22. Fuel tank 30 is shown toward the right and oil reservoir 32 below main seat 18 and just above exhaust 34.

Article 12 is one clamp of two symmetrical clamps, one on each side of motorcycle 10. Article 12 is attached to frame 14 just behind and below main seat 18 and extends upwardly and rearwardly following the contour of rear fender 22. Article 12 is attached to rear fender 22 and clamped to grip frame 14 without being welded or bolted through frame 14.

Figure 2:
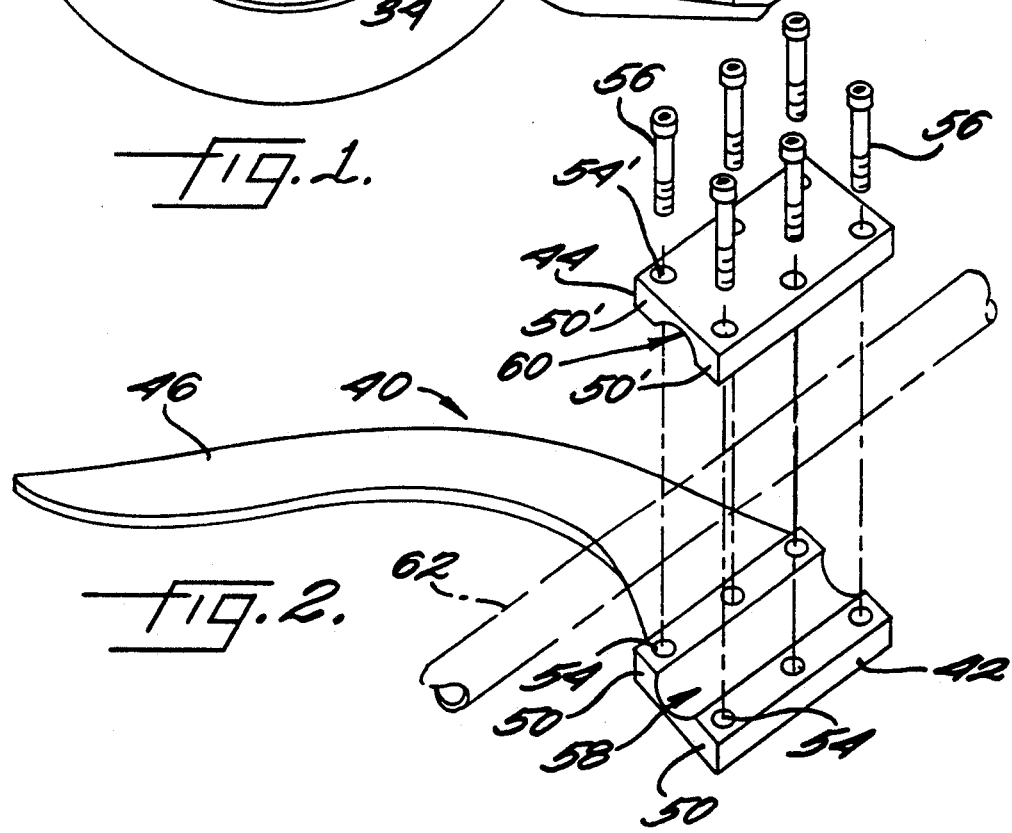
FIG. 2 is an exploded view of the article according to a preferred embodiment of the present invention.

As best seen in an exploded view in FIG. 2, one clamp 40 of article 12 has a first portion 42 and a second portion 44. First portion 42 has a curved member 46 extending from it. First and second portions 42, 44 each has a flange 50, 50', respectively, with a plurality of holes 54, 54' formed therein and tapped with threads to receive a plurality of bolts 56 when first and second portions 42, 44 are brought together and holes 54, 54' aligned. Further, first and second portions 42, 44 each has a recess 58, 60, respectively, which, when brought together form a channel dimensioned to receive and grip one member 62 of frame 14.

Figure 3:
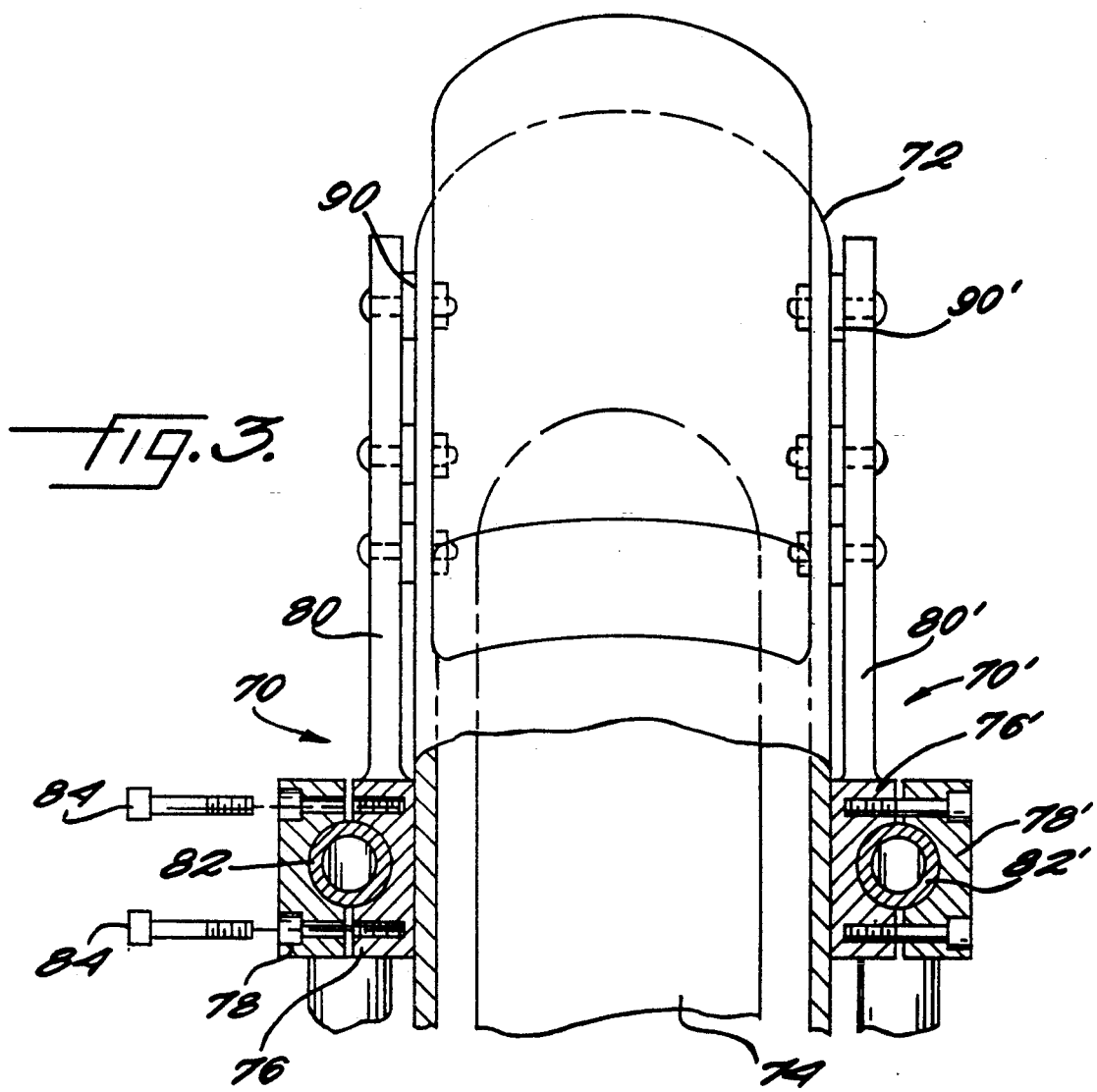
FIG. 3 is a cross-sectional view of the article shown in FIG. 1 from the rear of the motorcycle.

When viewed from the rear, with article 12 shown in partial cross section as in FIG. 3, clamps 70 and 70' will be seen as mirror symmetric on either side of rear fender 72, partially cut away, and rear tire 74. Clamps 70, 70' each has a first portion 76, 76' and a second portion 78, 78'. First portions 76, 76' each has a curved member 80, 80' extending therefrom and bolted to rear fender 72. Clamps 70, 70' grip members 82, 82' which form the rear portion of frame 14 of FIG. 1. First and second portions 76, 76' and 78, 78' are preferably bolted together with countersunk allen head bolts 84. Curved members 80, 80' are bolted to rear fender 72, preferably with spacers 90, 90' between fender 72 and curved members 80, 80'.

Figure 4:
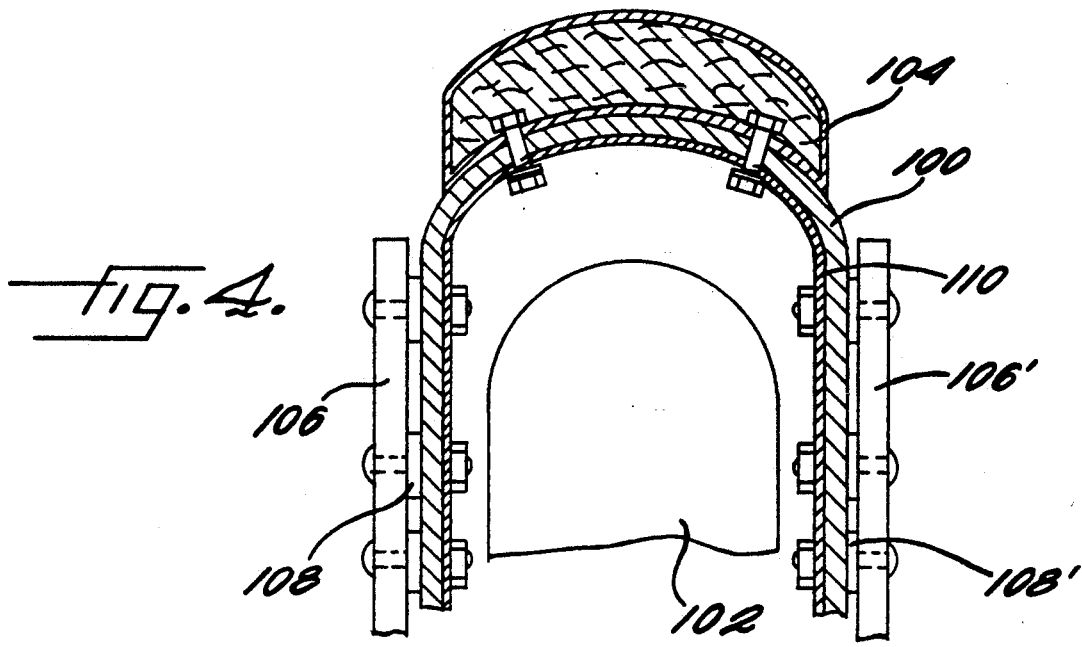
FIG. 4 is a cross-sectional view, similar to that shown in FIG. 3, of an alternative embodiment of the article according to the present invention.
Figure 5:
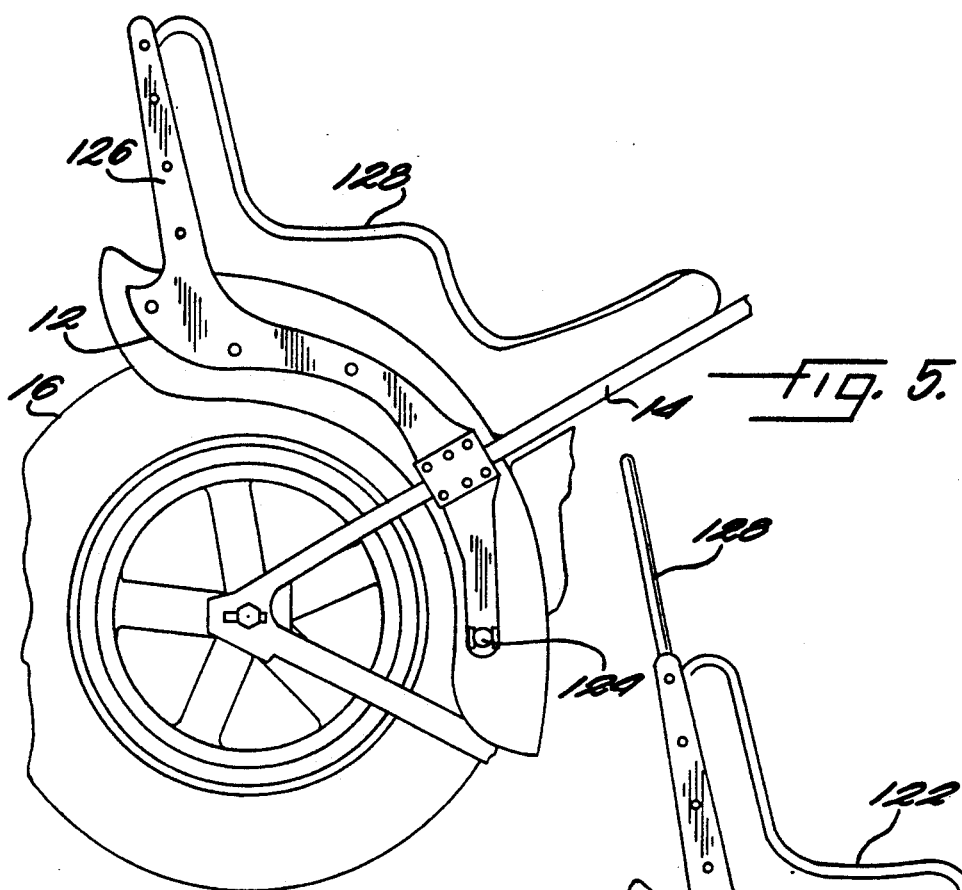
FIG. 5 is a partial, side view of a motorcycle showing an alternative embodiment of the present invention providing passenger foot pedal support and back rest support.

In an alternative embodiment shown in FIG. 4, rear fender 100 covers rear wheel 102 and has a rear seat cushion 104 attached thereto. Curved members 106, 106' are on each side of fender 100 bolted thereto with spacers 108, 108' between fender 100 and curved members 106, 106'. Inside fender 100 is a transverse member 110 connecting curved members 108, 108' and running transverse to curved members 108, 108'. Transverse member 110 provides additional support and stability for rear fender 100 and its load.

Article 12 (FIG. 1) will support both a rear seat and rider from the position of attachment to frame 14 without the need for struts from the axle of wheel 16. Because it follows the contours of rear fender 22, it does not interfere or compete with the lines of the unaltered motorcycle. In polished chrome, article 12 enhances the appearance of motorcycle 10 and, by providing support for rear fender 22, allows an additional rider or luggage to be carried thereon.

Article 12 is easily attached to motorcycle 10. Holes must be drilled into fender 22 for bolting curved portions thereto, but no welding or drilling is required to attach the clamps to frame 14.

Figure 6:
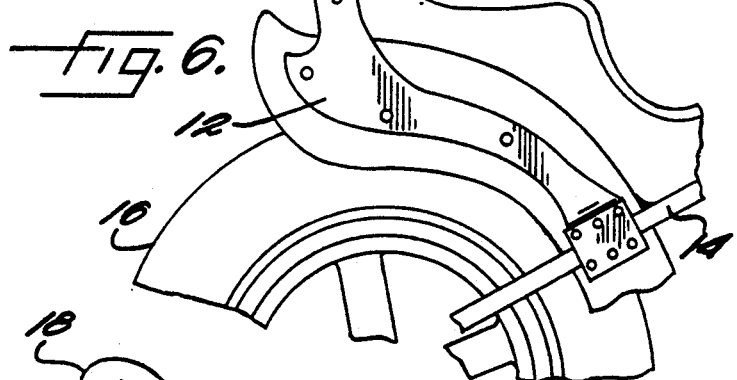
FIG. 6 is a partial, side view of a motorcycle showing another alternative embodiment of the present invention providing additional passenger seat back support.
Figure 7:
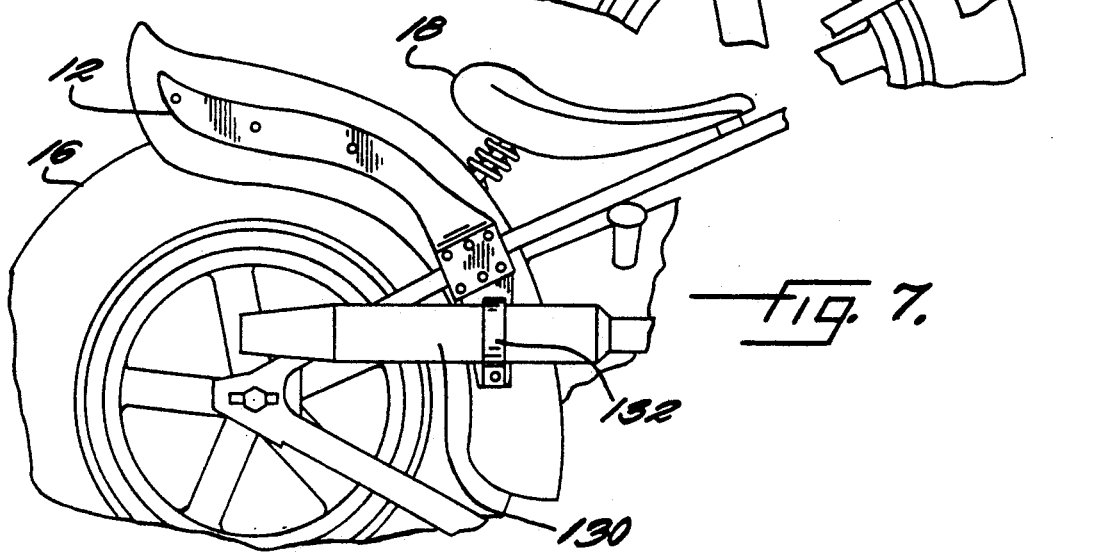
FIG. 7 is a partial, side view of a motorcycle showing an embodiment of the present invention as providing support for the exhaust muffler.

The article of the present invention is adaptable to provide support for a number of different items necessary or useful on a motorcycle and requiring support of one kind or another. These are illustrated in FIGS. 5 through 15. For example, an embodiment of article 12 shown in FIG. 5, which illustrates a partial, side view of a motorcycle, provides a support 120 for a cushion 122 having a passenger foot pedal 124 and back rest 126. In FIG. 6, article 12 is shown extended to provide a head restraint 128 for a passenger. FIG. 7 is again a partial, side view of a motorcycle showing article 12 according to the present invention providing support for the exhaust muffler 130 by means of a clamp 132.

FIG. 8 shows article 12 as providing support for an oil filter 140 and associated oil line 142. FIG. 9 shows article 12 providing a bracket 144 for support of a tool kit 146; and FIG. 10, support for rear lighting 150.

FIG. 11 is a partial, side view of a motorcycle showing article 12 supporting a rear seat pad 152; in FIG. 12, a luggage rack 154; in FIG. 13, a rear light 156 and license plate bracket 158; in FIG. 14, a tour pack 162; and in FIG. 15, a saddle bag 164.

It will be apparent to those skilled in the art that many changes and substitutions can be made to the preferred embodiment herein described without departing from the spirit and scope of the present invention as defined by the appended claims.

What is claimed is:

1. An article for supporting a rear fender of a motorcycle, said rear fender having a contour and said motorcycle having a rigid frame, said article comprising:

a clamp having a first portion and a second portion;

a curved member attached to and extending from said first portion of said clamp, said curved member formed to follow said contour of said rear fender;

first means for attaching said first portion to said second portion with said rigid frame therebetween; and second means for attaching said curved member to said fender so that said article, with said rigid frame between said first and said second portions, supports said fender.

2. The article as recited in claim 1, wherein said clamp has means formed in said first and said second portions for receiving said frame therebetween, said receiving means formed to complement said frame so that said clamp grips said frame when said first portion is attached to said second portion.

3. The article as recited in claim 1, wherein said second attaching means further comprises at least one bolt and at least one spacer between said fender and said curved portion.

4. The article as recited in claim 1, wherein said first and second portions each have a flange with a plurality of holes formed therein, said holes of said first portion alignable with said holes of said second portion, and said first attaching means further comprises a plurality of allen-head bolts for running through said aligned holes of said first and said second portions.

5. An article for supporting a rear fender of a motorcycle, said rear fender having a contour and said motorcycle having a rigid frame forked to define two members of said frame, said article comprising:

a pair of clamps, each clamp having a first portion and a second portion;

a curved member attached to and extending from said first portion of each of said clamps, said curved member formed to follow said contour of said rear fender;

each of said clamps having a first means for attaching said first portion to said second portion with one member of said rigid frame therebetween, and a second means for attaching said curved member to said fender so that each side of said fender is attached to said curved member of said first portion of one of said clamps and said clamps grip said frame members so that said article supports said fender.

6. The article as recited in claim 5, further comprising means connecting said curved members, said connecting means running from one of said curved members to another of said curved members.

7. The article as recited in claim 6, wherein said connecting means runs under said fender.

8. The article as recited in claim 5, wherein said first and said second portions each has a flange with a plurality of holes formed therein, said holes of said first portion alignable with said holes of said second portion, and said first attaching means further comprises a plurality of allen-head bolts for running through said aligned holes of said first and said second portions.

9. The article as recited in claim 5, wherein said second attaching means further comprises at least one bolt and at least one spacer between said fender and said curved member.

10. An article for supporting a rear fender of a motorcycle, said rear fender having a contour and said motorcycle having a rigid frame forked to define two rearwardly extending members, said article comprising:

a pair of clamps, each clamp having a first portion, a separate second portion and a channel formed in said clamp dimensioned for receiving one of said two frame members;

a curved member integral to and extending from said first portion of each of said clamps, said curved members formed to follow said contour of said rear fender;

said first portion and said second portion each having a flange with a plurality of holes formed therein, said holes of said flange of said first portion alignable with said holes of said flange of said second portion, and bolt means for attaching said first portion to said second portion, said first and said second portions gripping said frame member when said frame member is received in said channel and said portions are brought together and attached by said bolt means; and second means for attaching said curved member of each of said first portions to said fender so that each side of said fender is attached to said curved member of said first portion of one of said clamps, so that said article supports said fender.

11. The article as recited in claim 10, further comprising means for connecting said curved member of said clamps, said connecting means running under said fender.

12. The article as recited in claim 10, wherein said second attaching means further comprises a plurality of bolts attaching said curved member to said fender and a plurality of spacers between said fender and said curved member.

13. The article as recited in claim 10, wherein said bolt means further comprises a plurality of allen-head bolts.

14. The article as recited in claim 10, wherein said motorcycle has one passenger foot pad on each side of said rear fender and a passenger back rest and one of said flanges extends to support said passenger foot pads and said curved member each include an extension for supporting said passenger back rest.

15. The article as recited in claim 10, wherein said motorcycle has a muffler and one of said flanges further comprises a clamp for supporting said muffler.

16. The article as recited in claim 10, wherein said motorcycle has an oil filter, said oil filter supported by said article.

17. The article as recited in claim 10, wherein said motorcycle has rear lighting and each of said curved members further comprises a bracket for supporting said rear lighting.

18. The article as recited in claim 10, wherein said motorcycle has a tool kit and one of said flanges further comprises a bracket for supporting said tool kit.

19. The article as recited in claim 10, wherein said curved members extend over said fender to connect with each other and to form a rear support.

* * * * *